United States Patent Office 2,988,527
Patented June 13, 1961

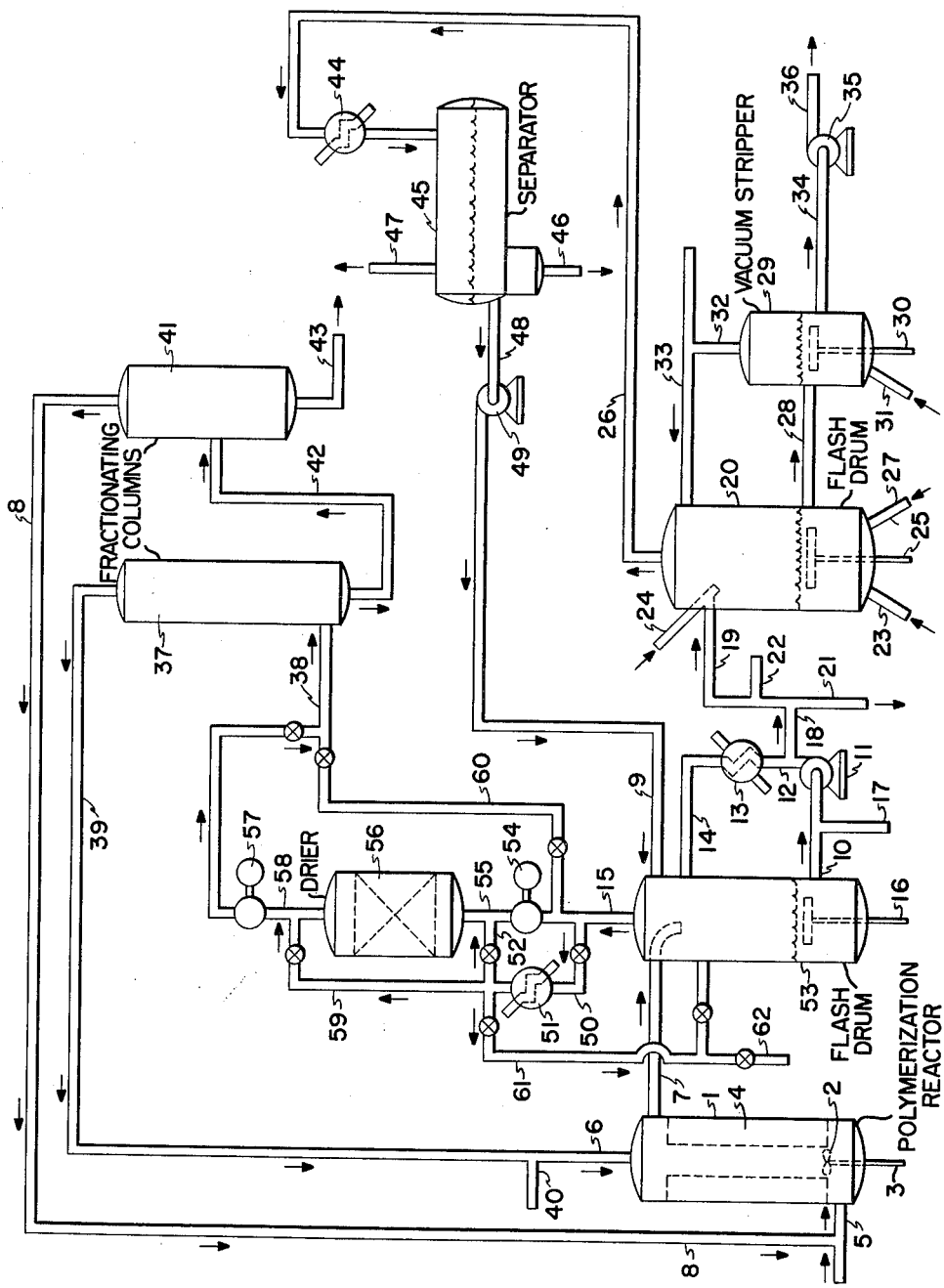

2,988,527
PROCESS FOR MODIFYING AN ISOOLEFIN POLYMER
Bruce R. Tegge, Madison, N.J., assignor to Esso Research and Engineering Company, a corporation of Delaware
Filed Mar. 22, 1957, Ser. No. 647,876
8 Claims. (Cl. 260—28.5)

This invention relates to improved processes for the production and recovery of certain homopolymers and copolymers. More particularly, the present invention relates to improved methods of dissolving and processing, for product recovery substantially saturated unvulcanizable solid polymerization products of isoolefins or mixtures of isoolefins with olefinic compounds containing an aromatic nucleus. This is a continuation in part of U.S. Serial No. 625,640, filed December 3, 1956, in the name of Bruce R. Tegge.

Broadly stated, the process of the present invention comprises contacting a low temperature polymer slurried in a diluent at a higher temperature with a solvent, boiling above the boiling point of the diluent at conditions adapted to volatilize diluent and dissolve at least a substantial portion of the polymer in the solvent, and recycling diluent to form additional slurry. This process is especially adapted for purposes of blending polymers with oils, resins, rubbers, waxes and asphalts or the like and for chemically modifying polymers or copolymers dissolved in solvents.

The present invention will be best understood by the following description wherein reference will be made to the accompanying drawing in which the single figure is a diagrammatic representation in the form of a flow plan depicting a typical process for the preparation and recovery of polymerization products of isoolefins or mixtures of isoolefins and vinyl aromatic hydrocarbons in accordance with the present invention.

In order to obtain high yields of polymers such as polyisoolefins or copolymers of isoolefins with vinyl aromatic hydrocarbons, such polymers are commercially produced in a diluent which is a non-solvent for the polymers such as $C_1$ to $C_3$ alkyl halides having boiling points below that of water. When polymerizing $C_4$ to $C_8$ isoolefins such as isobutylene, 2-methyl-1-butene and 3-methyl-1-butene or the like alone or with minor proportions of olefinic compounds containing an aromatic nucleus such as styrene, alpha methyl styrene, or para methyl styrene or the like, the polymerization is performed at low temperatures, e.g. below about $-50°$ C. and preferably below about $-80°$ C. down to about $-130°$ C. The polymer which is produced in a reaction zone, is in the form of a slurry (i.e., a dispersion of substantially insoluble solid polymer particles) in the alkyl halide diluent. This slurry is then caused to flow into a flash drum where it is contacted with steam to remove volatile materials and with hot water to reslurry the polymer in aqueous suspension. The polymer is then conventionally recovered by filtration, degassing extrusion and drying or the like. The polymer as recovered has a Staudinger molecular weight of between about 5,000 and 1,000,000, preferably between about 10,000 and 500,000.

Although best polymer yields of narrow molecular weight distribution are obtained when the polymer is produced as a slurry as outlined above, in many instances the resulting dried polymer must be subsequently dissolved in a solvent such as an inert hydrocarbon in order to facilitate the homogeneous blending of the polymer with oils, resins, rubbers, waxes, asphalt and the like. Also, where it is desired to chemically modify the polymer by halogenation, sulfonation such as in U.S. Patent 2,638,445, nitration or the like, such modification is best performed while the polymer is dissolved in a solvent. However, any known processes of dissolving such polymers are time consuming and expensive. The dissolution time varies depending upon the molecular weight of the polymer from a few minutes up to several hours or more providing reasonably sufficient agitating, churning or homogenizing means are employed.

The present invention provides an inexpensive and continuous process for converting high yields of undissolved polymer to dissolved polymer so as to facilitate chemical modification and/or subsequent blending with oils, waxes, asphalts or the like. This is accomplished by contacting the low temperature copolymer slurried in a diluent, and preferably the reactor effluent slurry, at a higher temperature with a solvent, preferably a $C_5$ to $C_{10}$ hydrocarbon boiling above the boiling point of the diluent, at conditions adapted to volatilize diluent and dissolve polymer in the solvent, the diluent vapors formed being preferably condensed and recycled in liquid form to the reactor. The resulting polymeric solution may then be optionally contacted with a chemical agent capable of modifying the same. The solution of polymer formed is, in any case, then contacted with a medium boiling above the boiling point of the solvent under conditions adapted to volatilize substantially all of the solvent, the solvent vapors formed being then condensed and recycled in liquid form to the flash zone. Where the higher boiling medium is an oil, wax or asphalt or the like, the end product is a blend of unmodified or chemically modified polymer in such medium. However, in the case where the polymer is chemically modified in solution, it is within the purview of the present invention to recover the modified polymer not only in the high boiling media described above but also in a non-solvent liquid medium boiling above the boiling point of the solvent, such medium being preferably an aqueous medium.

For the purposes of the present invention, the alkyl halide diluent is preferably an unreactive $C_1$ to $C_3$ alkyl halide which is an unreactive solvent for the monomer and catalyst but not for the rubbery polymer at polymerization conditions and which does not form a complex with the catalyst. Suitable diluents falling within the foregoing class of alkyl halides are methyl chloride, methylene chloride, ethyl chloride, ethylene chloride, methyl fluoride, ethyl fluoride, ethylene fluoride, 1-fluoro-2-fluoroethane, 1-fluoro-2-2'-difluoroethane, perfluoropropane, etc. The alkyl chlorides preferably contain one to two carbon atoms whereas the preferred alkyl fluorides contain one to three carbon atoms. Ethyl chloride, and even more especially, methyl chloride are the preferred alkyl halides.

Suitable hydrocarbon solvents include $C_5$ to $C_{10}$, advantageously $C_5$ to $C_9$, preferably $C_6$ to $C_8$ hydrocarbons such as normal or iso-paraffins including hexane, heptane, octane, isohexane, isooctane; naphthenes such as cyclohexane and methyl cyclohexane; aromatic hydrocarbons such as benzene, toluene and xylenes; substantially saturated hydrocarbon fractions such as virgin naphthas, gasolines, straight run mineral spirits; very light fractions of cracked gas oils or kerosenes; mixtures thereof, etc. Preferred solvents include substantially saturated hydrocarbons such as heptane, hexane, isooctane, cyclohexane, hydrogenated naphthas and hydrogenated gasolines.

As hereinbefore mentioned, the procedure in accordance with the present invention facilitates not only chemical modification of the polymeric material while in solution, but also facilitates the rapid and uniform blending of large amounts of such polymeric materials with liquids such as oils, waxes and asphalts in a rapid and uniform manner since the polymeric materials are dissolved in solvents. The addition of the polymeric solution to such high boiling materials under the conditions outlined above results in not only uniform blending but also simultaneous removal of the solvent. For example, polyisoolefins and especially polyisobutylene having a Staudinger molecular weight between about 5,000 and 30,000 and preferably between about 10,000 and 25,000 are preferably blended with lubricating oils as follows. The polyisoolefin is desirably produced as a slurry in a diluent, the diluent replaced by a hydrocarbon solvent and this hydrocarbon solvent volatilized while the polyisoolefin is being homogeneously blended with hot mineral lubricating oil. The same general process applied to the addition of copolymers of isoolefins with minor proportions, preferably about 10 to 40 weight percent based on copolymer of a vinyl aromatic hydrocarbon such as styrene to mineral lubricating oils. In both cases, the polymer or copolymer serves as a valuable V.I. improver and is advantageously added to a lubricating oil to form a concentrated solution, i.e. using a relatively small amount of the lubricating oil, by the blending process hereinbefore described. Such concentrated solutions of polymers or copolymers in oils generally contain about 15 to 35 weight percent of the polymeric material based on total solution.

Pressure sensitive tapes and adhesive plasters may also be made from polyisoolefins or isoolefin-vinyl aromatic hydrocarbon copolymers having Staudinger molecular weights between about 30,000 and 120,000 dissolved in $C_5$ to $C_{10}$ hydrocarbons in the manner disclosed in accordance with the present invention. Also, blends of about 15 to 40 weight percent of polymers or copolymers having molecular weights between about 30,000 and 120,000 with about 60 to 85 weight percent of paraffin wax may be obtained in accordance with the present invention by replacing the polymerization diluent with a $C_5$ to $C_{10}$ hydrocarbon and replacing this hydrocarbon with the higher boiling paraffin wax. Such polymer and wax blends have utility in waxed papers and milk cartons where leakage from low temperature cracking and flexing must be prevented. High molecular weight homopolymers and copolymers having Staudinger molecular weights between about 100,000 and 1,000,000 may also be blended with wax in the manner described above. The wax is generally present in amounts between about 90 and 99.5 weight percent, the remainder being the homopolymer or copolymer.

It is also within the purview of the present invention to blend about 0.05 to 5.0 and preferably about 0.5 to 3.0 parts by weight of polyisoolefins or copolymers of isoolefins and minor proportions (of say about 10 to 40 weight percent) of vinyl aromatic hydrocarbons with about 99.95 to 95.0 weight percent and preferably about 97.0 to 99.5 weight percent of asphalt. The inclusion of small amounts of such homopolymers or especially copolymers in asphalt has been found to make the asphalt less brittle at low temperatures and tougher at high temperatures. When blending such polyisoolefins or solid copolymers with resins or rubbers, they may be either heat-softened and/or dissolved in solvents prior to the formation of the blend in accordance with the instant invention.

In order to more fully illustrate the present invention, the following experimental data are given:

Example I

Referring now in detail to the drawing, the apparatus shown is suitable for the process of the present invention. There is provided a polymerization reactor 1 equipped with a stirrer 2 carried upon shaft 3. The reactor is surrounded by a heat insulating jacket 4 which is also a refrigerated jacket. The reactor is also equipped with feed inlet conduit 5, catalyst inlet conduit 6 and product line outlet 7.

In practicing the process in accordance with the present invention as applied to polyisobutylene, a polymerizable feed containing about 25 weight percent of isobutylene of at least 98% purity dissolved in methyl chloride is continuously charged to the reactor via conduit 5. Simultaneously an 0.05 weight percent solution of an aluminum chloride catalyst dissolved in methyl chloride is charged to reactor 1 via conduit 6. The conversion of monomer to polymer is maintained at 75 percent by controlling the above catalyst to feed ratio to about 0.15 to 1.0 on a weight basis; the polymer product quality being controlled by maintaining the polymerization temperature at $-135°$ F. (i.e., $-92°$ C.). The polymerization reaction is carried out at about 25 p.s.i.g. which is 5 p.s.i. above the pressure in flash drum 53.

The above reaction produces a slurry of about 16.5 weight percent of polyisobutylene in methyl chloride and unpolymerized isobutylene is then discharged from the reactor via conduit 7 to flash drum 53 which is fitted with an agitator 16. Flash drum 53 is maintained, as will appear more fully hereinafter, at a temperature sufficiently high to vaporize methyl chloride but at a pressure of about 5 p.s.i. below the pressure in reactor 1 as will be described more fully hereinafter. Flash drum 53 is preferably operated at a temperature of about 130° F. and at a pressure of about 25 p.s.i.a. Simultaneously, a hydrocarbon liquid having a boiling point above the boiling point of methyl chloride (e.g. $-24°$ C.) and preferably boiling at about 20° to 120° C. (e.g. n-hexane boiling at 69° C.) is injected into flash drum 53 via conduit 9. The hydrocarbon may optionally contain about 50 parts per million of water, i.e., sufficient water to deactivate the catalyst. Alternatively, a small amount (about 100-500 p.p.m. based on hydrocarbon) of an oxygenated hydrocarbon such as isopropanol may either be blended with the solvent or injected into flash drum 53 to prevent "after" polymerization. In the present example, no isopropanol or other oxygenated hydrocarbon was used. As before mentioned, the flash drum is maintained at a lower pressure than the pressure in the reactor. This is to force the slurry of polyisobutylene in methyl chloride from the reactor to the flash drum. Flash drum 53 may be heated by any suitable heat exchange means such as a heating coil in the lower portion of the flash drum (not shown) or the pump-around heat exchange system as shown which comprises outlet conduit 10, pump 11, conduit 12, heat exchanger 13, and inlet conduit 14.

The temperature and pressure in the flash drum is regulated whereby to flash off a sufficient amount of methyl chloride via conduit 15 to cause the polyisobutylene to dissolve in the hydrocarbon solvent. In the present example, the temperature is maintained at a level of about 130° F. and the pressure at about 25 p.s.i.a. with about 90 weight percent of the methyl chloride being removed. The polyisobutylene dissolved in the hydrocarbon solvent is withdrawn via conduit 18. This polyisobutylene solution may then be either injected into hydrocarbon flash drum 20 via conduit 19, or if it is to be chemically modified or added to a lubricating oil, wax, asphalt, or the like, the solution is advantageously drawn off via conduit 21. When the polymer has been chemically modified or the solution has been suitably blended with such oils, waxes, or asphalts, the resulting blend may be heated to a temperature sufficient to drive off the hydrocarbon solvent or the blend may be introduced into conduit 19 via conduit 22 for injection into hydrocarbon flash drum 20. Alternatively, the polyisobutylene solution may be withdrawn through line 17 and blended with oil, wax, or asphalt, and subsequently injected into conduit 19 via line 22 for introduction into flash drum 20 as outlined above. It is also within the purview of the present invention to add such materials as lubricating oil, gas oil or molten wax directly into flash drum 53 (not shown) and the resulting blend of polyisobutylene subsequently stripped of hydrocarbon solvent by any of the procedures outlined above. In the present example, the solution of dissolved polyisobutylene is withdrawn via conduit 21 and blended with 4 parts by weight of mineral lubricating oil and the resulting blend introduced into flash drum 20 via conduits 22 and 19.

The chemically modified polyisobutylene in solution or the blend of polyisobutylene in solution with lubricating oil or the like being introduced into flash drum 20 generally contains about 2 to 25 weight percent (e.g. 10 weight percent) of dissolved polyisobutylene. As the polyisobutylene solution enters flash drum 20 via conduit 19, it is optionally steam atomized by atomizer 24 at a temperature of about 180° F. and a pressure of about 15 p.s.i.g. Flash drum 20 may alternatively consist solely of a heating means adapted to volatilize the polymer solvent. In still another embodiment, flash drum is fitted with a water inlet 23 (as shown) and with agitator 25. Flash drum 20 is also advantageously operated at about 180° F. and about 15 p.s.i.g. and may optionally contain supplemental steam inlet conduit 27. The vaporized hydrocarbon (e.g., hexane) is withdrawn via conduit 26 and recovered as more fully described hereinafter.

When the polymer is recovered as a water slurry, the slurry may contain about 2 to 5 weight percent of polymer. In this case, a 3 weight percent polymer slurry in water is withdrawn from hydrocarbon flash drum 20 via conduit 28 to vacuum stripper 29 which is likewise fitted with agitator 30, low pressure steam conduit 31, and overhead vacuum steam jet recovery conduit 32. The stripper is advantageously operated at about 140° F. and about 5 p.s.i.a. and serves to remove the last traces of the hydrocarbon solvent from the polymer-water slurry and return the same to hydrocarbon flash drum 20 via conduits 32 and 33. Regardless of the particular method of recovering the polymer, the resulting polymer is finally withdrawn via conduit 34 and pumped by pump 35 through conduit 36 to storage.

The hydrocarbon solvent (e.g., hexane) in accordance with the process of the present invention is recovered from hydrocarbon flash drum 20 via line 26 through condenser 44 to separator 45. In separator 45 the heavier water layer, if present, is settled out via conduit 46. Residual alkyl halide vapors, if any, are vented through line 47. The remaining material which is substantially pure hydrocarbon solvent containing about 50 parts per million of water is recycled via conduit 48 through pump 49 and conduit 9 to methyl chloride flash drum 53.

The methyl chloride diluent is recovered via line 15 optionally by compressing the vapors in first stage compressor 54 to about 50 p.s.i.g. discharge pressure, optionally drying the methyl chloride by introducing the same via conduit 55 to alumina drier 56 and optionally again compressing the methyl chloride to about 160 p.s.i.g. in second stage compressor 57. Alternatively, and in accordance with the present example, methyl chloride flash drum 53 is maintained under sufficient pressure (e.g. 150 p.s.i.g.) that the methyl chloride diluent vapors are readily condensed by cooling water in indirect heat exchange therewith, thereby eliminating the necessity of compressors 54 and 57. In this latter instance, the methyl chloride is recovered via line 15, conduit 50, condenser 51, line 52, conduit 55, drier 56, conduit 58, second stage compressor 57, and conduit 38 into fractionating column 37. A portion (20 weight percent) of the alkyl halide vapors condensed in condenser 51 are advantageously recycled via conduit 61 to flash drum 53 to enrich the overhead vapor in methyl chloride passing out conduit 15. As an alternative embodiment other than the instant example, methyl chloride may be recovered via line 15, conduit 50, condenser 51, line 59, conduit 58, second stage compressor 57, and conduit 38 into fractionating column 37 or merely via conduits 60 and 38 into fractionating column 37.

In any case, the resulting methyl chloride stream is introduced into fractionating column 37 via conduit 38. This fractionating column is fitted with a reboiler, contains about 50 plates, and operates at a reflux ratio of about 10:1. The overhead product comprises about 10 weight percent of the tower feed and is substantially pure methyl chloride. This overhead product is recycled via overhead conduit 39 to catalyst inlet conduit 6 leading into reactor 1 after having been blended with the desired amount of aluminum chloride catalyst from conduit 40. The bottoms from fractionating column 31 are fed into a second fractionating column 41 via conduit 42. Fractionating column 41 contains about 20 plates and operates at a reflux ratio of about 1.5:1. The major proportion (e.g. 90 weight percent) of the methyl chloride diluent is then withdrawn from fractionating column 41 via overhead conduit 8 and mixed with fresh monomer to be charged via line 5 to reactor 1. The methyl chloride leaving fractionating column 41 via line 8 contains about 6 weight percent of $C_4$ unsaturates such as isobutylene. The bottoms from fractionating column 41 are then introduced via conduit 43 to a 50-plate stripping column (not shown), from which a small amount of methyl chloride and $C_4$ unsaturates (principally isobutylene) are recovered and recycled to conduit 8. The stripper bottoms is now free of methyl chloride and comprises additional amounts of $C_4$ hydrocarbons, principally isobutylene, which are conventionally blended with other streams containing isobutylene, which are then treated in a conventional isobutylene extraction unit to recover the same for use as makeup monomer.

*Example II*

A copolymer of about 60 weight percent isobutylene and 40 weight percent styrene is produced as a slurry in methyl chloride dissolved in a hydrocarbon solvent and incorporated in asphalt while in solution in accordance with the present invention as hereinafter described. Referring again to the drawing, 3000 pounds per hour of 99.3 weight percent isobutylene and 2000 pounds per hour of 99.2 weight percent styrene are mixed in conduit 5 with the recycle stream from conduit 8 consisting of 22,700 pounds per hour of methyl chloride. The combined streams are cooled to −140° F. and fed to reactor 1. Although only one reactor is shown in the accompanying drawing, it is to be understood that the process may advantageously be staged using about 2 to 5 (e.g. 3) reactors in series with an increase in conversion in each respective stage. By thus staging the process, overall conversion may be increased and products of higher molecular weight may be obtained. In order to catalyze the copolymerization, 8.0 lbs. per hour of aluminum chloride dissolved in 4000 pounds per hour of purified methyl chloride catalyst are cooled to −130° F. and injected into reactor 1 via catalyst conduit 6. The polymerization is carried out at −135° F. and results in 4800 lbs. per hour of a 15.1 weight percent copolymer slurry issuing from reactor 1 via conduit 7. This stream passes directly to methyl chloride flash tank 53 which is operated at 150° F. and 50 p.s.i.g. The vapor rate from this flash drum out overhead conduit 15 amounts to 38,400 pounds per hour having a composition of 76.3 weight percent methyl chloride, 23.1 weight percent hexane, the remaining 0.6 weight percent being isobutylene and styrene monomers. This vapor stream is passed into conduit 50, cooled in heat exchanger 51 to 90° F., whereby 10,000 pounds per hour of vapors are condensed, and returned to flash drum 53 via line 61 to enrich the overhead vapor stream in methyl chloride passing out conduit 15. The uncondensed vapors from heat exchanger 51 bypass the first stage compressor 54 entering alumina drier 56 via conduits 52 and 55. In this step of the process, alumina drier 56 acts as a guard chamber for the removal of trace quantities of water. Another important function of alumina drier 56 is the removal of trace quantities of polymerization poisons such as methyl, alcohol, dimethyl ether, or the like, so that such poisons, if utilized, may be added to the reactor in carefully controlled quantities. After passing through alumina drier 56, the vapor stream at a rate of 28,400 pounds per hour is compressed to 165 p.s.i.g. in compressor 57 and enters the methyl chloride purification fractionating column 37 via conduit 38. This column which comprises 50 fractionating plates is operated at a reflux ratio of 10:1 and takes overhead 4,000 pounds per hour of highly purified methyl chloride in conduit 39. The bottoms stream of 24,400 pounds per hour from this column is fed via conduit 42 to a second fractionating column 41 having 20 fractionating plates. In this column, 22,700 pounds per hour of methyl chloride and 50 pounds per hour of $C_4$ olefins, principally isobutylene, are taken overhead into conduit 8. The bottoms from fractionating column 41 issuing via conduit 43 consist of 50 pounds per hour of $C_4$ olefins, principally isobutylene, 100 pounds per hour of $C_8$ hydrocarbons, principally styrene (e.g. 90 weight percent styrene) and 1,500 pounds per hour hexane. These $C_4$ and $C_8$ hydrocarbons are purged from the copolymerization plant to conventional isobutylene and styrene extraction units, respectively, while 1,500 pounds per hour of hexane are recovered and recycled from conduit 43 to conduit 26 (by suitable piping not shown) through condenser 44, optionally through settler 45, conduit 48, pump 49, and conduit 9 ultimately to methyl chloride flash drum 53.

A 10 weight percent isobutylene-styrene copolymer solution in the hexane solvent is produced in methyl chloride flash drum 53. This stream of 48,000 pounds per hour consists predominantly of solvent hexane but also contains about 9.0 weight percent of methyl chloride. This solution, containing 4,800 pounds per hour of copolymer and 125 parts per million of water based on hexane, is withdrawn via conduit 17, blended with 100,000 pounds per hour of asphalt and then fed directly via conduits 18 and 19 into hexane flash drum 20 operating at 165° F. and 10 p.s.i.g. These conditions produce an essentially pure blend of isobutylene-styrene copolymer in asphalt and simultaneously flash overhead (in combination with vacuum stripper 29 operating at 140° F. and 5 p.s.i.a.) all of the remaining methyl chloride and hexane solvent. In this example, 4,300 pounds per hour of methyl chloride and 42,000 pounds per hour of hexane are flashed overhead into conduit 26 to be condensed and cooled to 120° F. in condenser 44. The hexane is then combined with 1,500 pounds per hour of recycled hexane from the fractionating system (not shown) as well as 10,000 pounds per hour of condensed vapors (not shown) from conduit 62 leading from cooler 51 via conduit 61 to methyl chloride flashing drum 53.

It has been observed that when practicing the process of the present invention in accordance with the foregoing examples, polyisobutylene and copolymers of isobutylene and styrene are dissolved much more rapidly than has been possible heretofore. Also, the recycle streams of methyl chloride, isobutylene (or isobutylene and styrene) do not have to be dried with a solid desiccant, the catalyst efficiency being maintained accordingly at a high level over long periods of time. Also, plugging of control valves with ice and methyl chloride hydrates have not been experienced. Analysis of the recycled catalyst streams have shown negligible amounts of such reaction poisons as hydrochloric acid, methyl alcohol, and dimethyl ether, thus facilitating the addition of carefully controlled small quantities of such poisons, if desired, in order to control polymer or copolymer molecular weight.

Resort may be had to various modifications and variations of the disclosed embodiments of the present invention without departing from the spirit of the invention or the scope of the appended claims.

What is claimed is:
1. In the continuous process for making and recovering high molecular weight rubbery polymers selected from the group consisting of homopolymer of a $C_4$ to $C_8$ isoolefin and copolymer of a $C_4$ to $C_8$ isoolefin with a vinyl aromatic hydrocarbon made by continuous Friedel-Crafts polymerization in a diluent consisting of inert $C_1$ to $C_3$ alkyl halide diluent which is a first non-solvent for the polymer therefrom, whereby there is continuously produced a polymerization reaction first slurry dispersed in a liquid medium consisting essentially of said alkyl halide diluent, the improvement which comprises; contacting said first slurry at a temperature above the boiling point of said diluent with a $C_5$ to $C_{10}$ liquid hydrocarbon solvent for the polymer to volatize and diluent therefrom and to directly dissolve polymer therein while maintaining the temperature at about 130° F., said solvent boiling above the boiling point of said diluent; modifying the polymer by incorporating into said solution a material selected from the group consisting of asphalt, paraffin wax, mineral lubricating oil, and mixtures thereof; contacting said solution having said modified polymer therein with a second non-solvent aqueous liquid medium at a temperature above the boiling point of said solvent to volatize solvent therefrom and to form a second slurry of copolymer in said second non-solvent, said second non-solvent boiling above the boiling point of said solvent; and subsequently recovering said modified polymer from said second slurry.

2. Process according to claim 1 in which the polymer product is polyisobutylene.

3. Process according to claim 1 in which the polymer product is a copolymer of a major proportion of isobutylene and a minor proportion of styrene.

4. Process according to claim 1 in which the hydrocarbon material is a mineral lubricating oil.

5. Process according to claim 1 in which the hydrocarbon material is paraffin wax.

6. Process according to claim 1 in which the hydrocarbon material is asphalt.

7. Process according to claim 1 in which the polymer is a polyisobutylene having a Staudinger mol. wt. of about 10,000 to 500,000, the alkyl halide diluent is methyl chloride, the diluent flashing temperature is maintained at least as high as 130° F., the solvent is n-hexane, and the solvent flashing temperature is maintained at least as high as 165° F.

8. An improved continuous process for recovering a polyisobutylene having a Staudinger mol. wt. of about 10,000 to 500,000, said polyisobutylene being initially slurried in cold liquid methyl chloride, which comprises continuously contacting said cold slurry with a sufficient amount of hexane solvent continuously maintained at a temperature at least as high as about 130° F. to continuously volatilize sufficient methyl chloride to continuously dissolve substantially all of the polyisobutylene in the hexane, continuously condensing methyl chloride vapors formed, continuously recycling said condensed methyl chloride in liquid form to the polymerization reactor and continuously flashing the resulting polyisobutylene-n-hexane solution into a higher boiling hot liquid medium comprising a material selected from the group consisting of asphalt, paraffin wax, mineral lubricating oil, and mixtures thereof, solvent media and a non-solvent aqueous medium, said hot liquid medium being continuously maintained at a temperature at least as high as 165° F. to remove substantially all of said hexane solvent.

References Cited in the file of this patent
UNITED STATES PATENTS

| | | |
|---|---|---|
| 2,408,007 | Thomas et al. | Sept. 24, 1946 |
| 2,583,420 | Garber et al. | Jan. 22, 1952 |
| 2,638,445 | Young et al. | May 12, 1953 |